(12) United States Patent
Kuhne

(10) Patent No.: US 7,286,132 B2
(45) Date of Patent: Oct. 23, 2007

(54) SYSTEM AND METHODS FOR USING GRAPHICS HARDWARE FOR REAL TIME TWO AND THREE DIMENSIONAL, SINGLE DEFINITION, AND HIGH DEFINITION VIDEO EFFECTS

(75) Inventor: Stefan B. Kuhne, Gilroy, CA (US)

(73) Assignee: Pinnacle Systems, Inc., Mountain View, CA (US)

( * ) Notice: Subject to any disclaimer, the term of this patent is extended or adjusted under 35 U.S.C. 154(b) by 212 days.

(21) Appl. No.: 10/829,324

(22) Filed: Apr. 22, 2004

(65) Prior Publication Data

US 2005/0237326 A1    Oct. 27, 2005

(51) Int. Cl.
*G06T 1/00* (2006.01)
*G06T 1/60* (2006.01)
*G06T 9/00* (2006.01)

(52) U.S. Cl. ................... 345/501; 345/530; 345/555

(58) Field of Classification Search ................ 345/506, 345/501, 502, 530, 555; 386/52; 382/232, 382/233
See application file for complete search history.

(56) References Cited

U.S. PATENT DOCUMENTS

| | | | |
|---|---|---|---|
| 6,226,038 B1 * | 5/2001 | Frink et al. .................. 348/443 |
| 6,233,389 B1 * | 5/2001 | Barton et al. ................. 386/46 |
| 6,337,710 B1 * | 1/2002 | Watkins ...................... 348/180 |
| 6,573,905 B1 | 6/2003 | MacInnis et al. |
| 2001/0053275 A1 | 12/2001 | Adachi et al. |
| 2003/0061457 A1 * | 3/2003 | Geiger et al. ............... 711/165 |
| 2003/0212742 A1 * | 11/2003 | Hochmuth et al. ......... 709/204 |
| 2004/0091243 A1 * | 5/2004 | Theriault et al. ............. 386/52 |

* cited by examiner

Primary Examiner—Kee M. Tung
Assistant Examiner—Joni Hsu
(74) *Attorney, Agent, or Firm*—Peter J. Gordon; John A. Hamilton

(57) ABSTRACT

A method, system, and computer readable medium including instructions for processing single definition or high definition video data to produce an two dimensional and three dimensional effects to occur at a future time. The effects are created in a video processing system using multiple threads.

27 Claims, 10 Drawing Sheets

SYSTEM AND METHODS FOR USING GRAPHICS HARDWARE FOR REAL TIME TWO AND THREE DIMENSIONAL, SINGLE DEFINITION, AND HIGH DEFINITION VIDEO EFFECTS

DESCRIPTION

1. Field

The present invention generally relates to video and graphics processing systems, and more particularly, to methods and systems for using graphics hardware for real time two and three dimensional, single definition, and high definition video effects.

2. Background

Today's reduced prices for electronic equipment and various technological advances make high tech electronic equipment available to a wide majority of consumers. This is especially true in the area of video processing, recording, capturing, and editing. Since personal computers are in widespread use, consumers can easily view and record video data on personal computer and capture video data from the video devices. Further, with the increase in the processing speed of personal computers, consumers can edit video data, such as adding effects or graphics, and view video which has effects or graphics on personal computers.

Most personal computers have both a central processing unit ("CPU") and a graphics card. Modern graphics cards include a graphics processing unit ("GPU") and video memory separate from the CPU and system memory. Conventionally, video editing comprises receiving multiple input streams from video or still images on a timeline and combining these streams with effects (e.g., transitions or clip effects) in order to create a single video output file. This process utilizes the CPU or GPU to perform several tasks.

FIG. 1 illustrates an example of a conventional video editing process (100). First, the computer receives and decodes the incoming video data utilizing the CPU (stage 102). For example, the video may be stored or captured in a standard format (e.g., MPEG), which requires decoding before processing. Since decoding schemes can be complex, the decoding process is highly expensive in CPU cycles.

Next, the computer sequences the effects that are involved in one frame result to determine the most desirable setup (stage 104). During this step, in order to avoid mixing GPU/CPU effects, the computer may replace GPU effects with CPU effects, or vice versa, replacing compatible effects if possible. Then, if the sequence of effects will overly tax resources, such as memory, the computer divides the task to sequence the effects and reduce complexity (stage 106).

Next, the computer transfers the decoded video data to a graphics card for processing by the GPU (stage 108). Then, from the decoded video and sequenced effects, the graphics card creates intermediate data, for example, polygon models and timeline information, needed to render a frame (stage 110).

Next, the GPU renders the intermediate result of the decompressed video data and effects (stage 112). Then, the computer determines if CPU/GPU mixing is needed (stage 114). If mixing is required, the CPU will read back the rendered intermediate result for processing. If this is the case, the process returns to stage 108. However, if read back is required, video editing in real time will not be possible.

After all the processing is performed, the finalized video data including the effects is displayed (stage 116). For example, the video including the effects may be displayed on a computer monitor.

Sometimes the edited data with the effects may need to be saved (stage 118). For example, the edited data may be needed as background rendered content. If the edited video data needs to be saved, the data is read back to the CPU (stage 120). If read back is required, video editing in real time will not be possible. Then, the computer compresses the read back video data which is CPU intensive (stage 122). The compressed data may be stored for later use.

In the above-mentioned video editing process, the video data received in stage 102 may be obtained in several ways. One method for obtaining the data is by capturing video data with a computer from a video device, such as a digital video or still camera. FIG. 2 illustrates a process for capturing video from a video device. First, the computer reads the video data from the device (stage 202). The computer can read the data via a conventional data port, such as IEEE1394 (Firewire) or USB2. The video data may include video footage from a video camera, still images from a camera, or a video signal from a cable or satellite TV system.

Then, the computer stores the data on a storage device, such as a magnetic hard drive (stage 204). Next, since most video data captured from video devices is encoded according to conventional format, such as M.P.E.G., the computer decodes the video data so that it is capable of being displayed (stage 206). Next, the computer transfers the decoded video data to the graphics card (stage 208). Finally, the graphics card processes the decoded data and the data is displayed (stage 210).

In the above method for video editing, editing of video in real time may be prevented because of a need to read back data. Further, there exist several drawbacks that tax the resources of the computer. For example, the CPU may be using nearly all available processing time for decompression and the GPU is spending processing time in creating the effects. Further, every call into a graphics application programming interface (e.g., direct X) may have highest priority from the operating system ("OS"). Since a stall in the video device driver may be a "Ring 0" stall, the interface call creates "dead CPU time." In other words, as the GPU is processing and creating the effect, the video device driver awaits the results for display. Since the video device driver has highest priority, all other computer processes are delayed while the video device driver waits for the GPU to finish processing. Thus, when the driver is waiting for a result from the GPU, the computer loses CPU cycles, which reduces the availability of the CPU for decoding. Additionally, read backs from the graphics card may be asynchronous read backs, which may stall the CPU until the read back is finished.

In the past, most video signals were standard definition ("SD") video, having a rate of 720×480×2×30=41 MB/s per stream. But with the advent of high definition ("HD") video, having a resolution of 1080 p, the incoming data rate may be 1920×1080×2×60=250 MB/s per stream. This introduces much more data into the video capture and editing process. Accordingly, the above mentioned drawbacks are amplified.

In response to these problems, several specialized products have been created to deal with video editing in real time. For example, the Pinnacle ProONE system creates real time effects using separate hardware. The Matrox Flex3D system creates real time effects with specialized graphics and decoder boards. The Silicon Graphics Octane system creates real time effects using specialized graphics hardware. The Softimage DS system edits video in 3D, but is unable to play in real time. The Avid Real Vision HD10 utilizes specialized hardware to create real time effects. However, in all these products, specialized hardware decoders, graphics boards, or specialized computers are required for real time video editing. Thus, conventional personal computers and other general computing devices are incapable of performing real time video without specialized hardware.

SUMMARY

Accordingly, the present invention is directed to systems and methods for using graphics hardware for real time two and three dimensional, single definition, and high definition video effects which obviates one or more of the limitations and disadvantages of the related art.

In accordance with aspects consistent with the present invention, methods, systems, and computer readable media including instructions for performing a method for processing video data to produce an effect to occur at a future time, comprising: implementing an application thread for creating the effect to be added to the video data, generating pre-decompressed video data from the video data, and determining parameters which describe the effect; implementing an upload thread for uploading the pre-decompressed video data into video hardware; implementing a decoding thread for decoding the pre-decompressed video data to produce decoded video data; implementing a render thread rendering the effect in the decoded video data to produce output video data; and implementing a presenter thread presenting the output video data.

In accordance with aspects consistent with the present invention, methods, systems, and computer readable media including instructions for performing a method for processing video data to produce an effect to occur at a future time, comprising the steps of: receiving the video data; creating the effect; generating pre-decompressed video data from the video data; uploading the pre-decompressed video data into video hardware; decoding the pre-decompressed video data to produce decoded video data; determining parameters which describe the effect; rendering the effect in the decoded video data to produce output video data; and presenting the output video data.

Additional aspects related to the invention will be set forth in part in the description which follows, and in part will be obvious from the description, or may be learned by practice of the invention. Aspects of the invention may be realized and attained by means of the elements and combinations particularly pointed out in the appended claims.

It is to be understood that both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification exemplify certain aspects of the present invention and, together with the description, serve to explain some of the principles associated with the invention.

DETAILED DESCRIPTION

Figure 1:
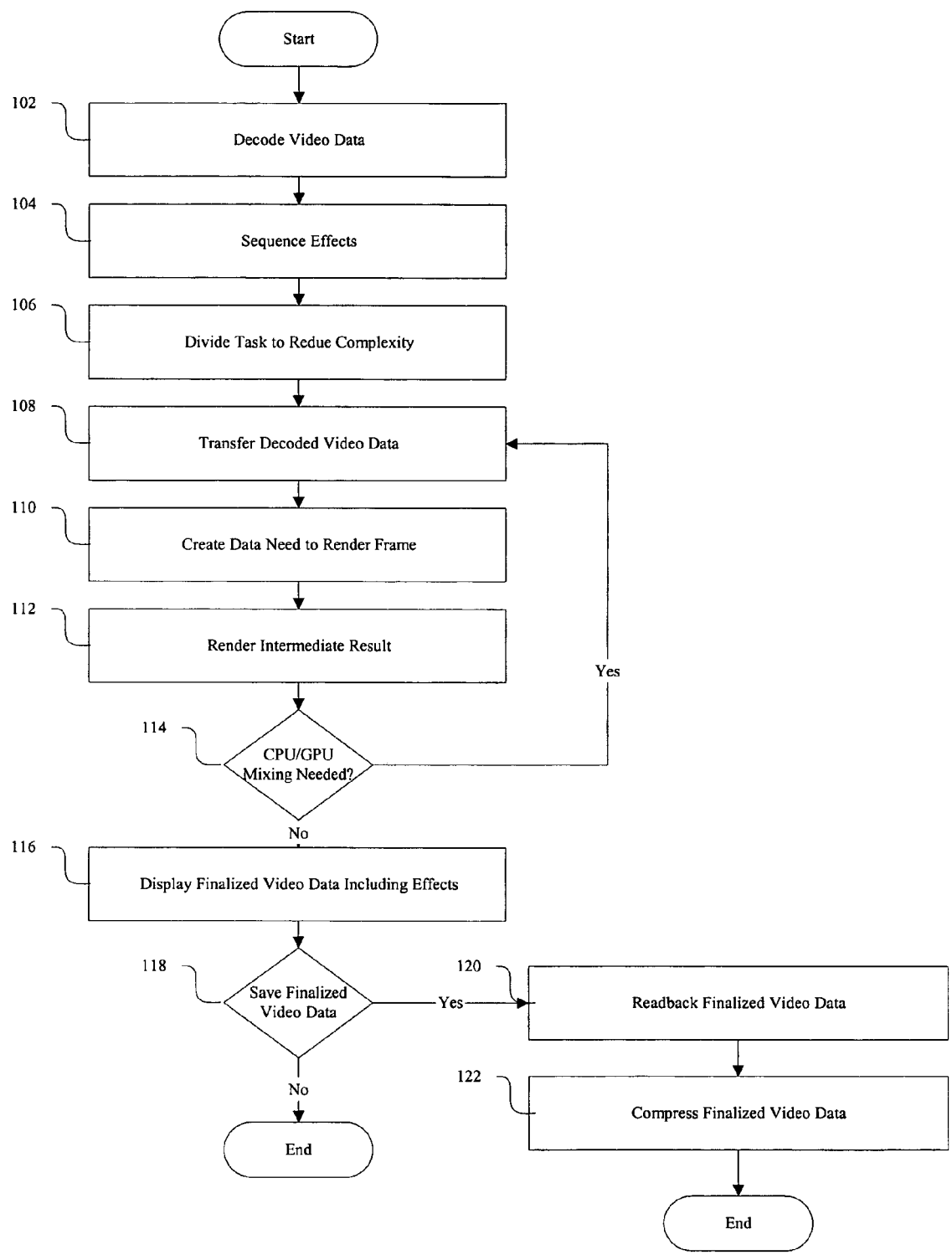
FIG. 1 is a flowchart which illustrates a conventional video editing process.
Figure 2:
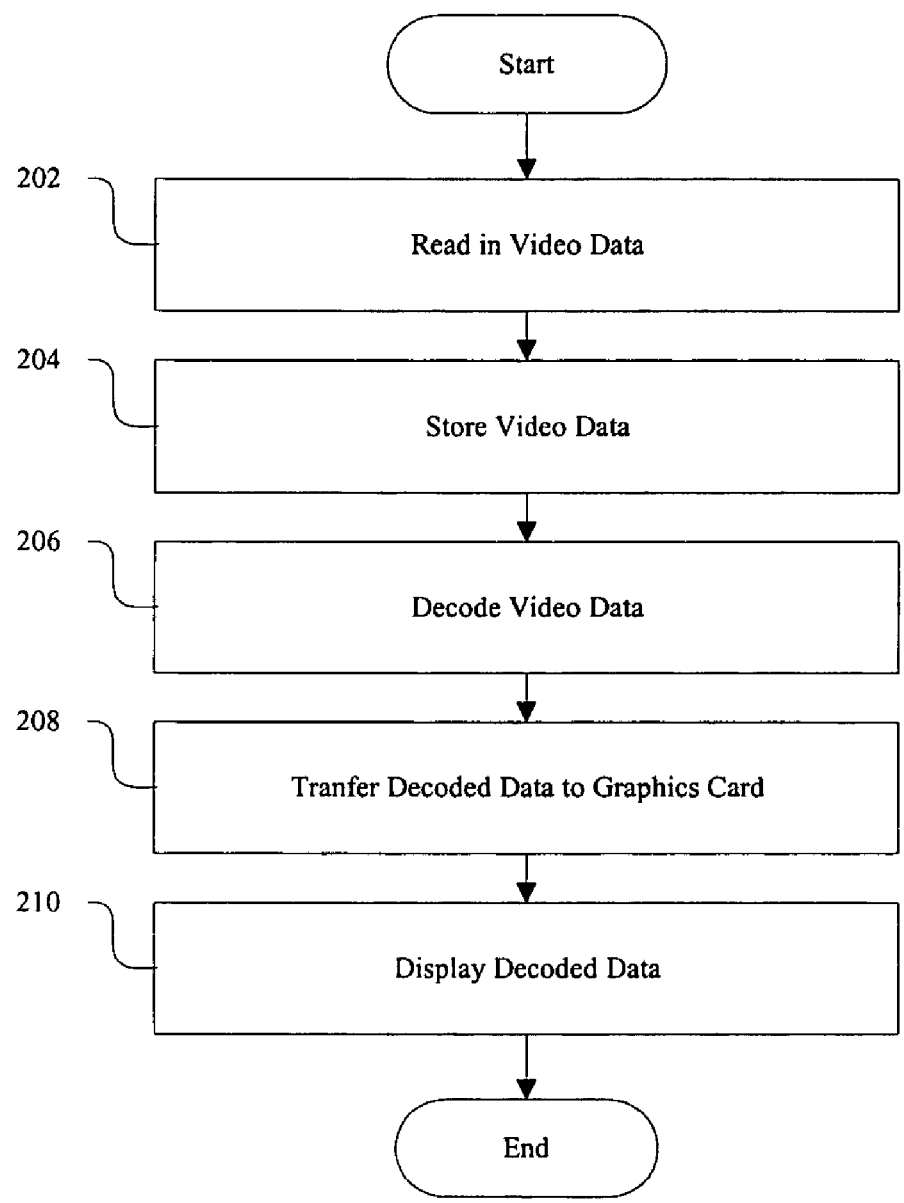
FIG. 2 is a flowchart which illustrates a conventional video capture process.

Reference will now be made in detail to exemplary embodiments of the present invention, examples of which are illustrated in the accompanying drawings. Wherever possible, the same reference numbers will be used throughout the figures to refer to the same or like elements. The accompanying figures illustrate exemplary embodiments and implementations consistent with the present invention, which are described in sufficient detail to enable those skilled in the art to practice the invention. The description of the exemplary embodiments does not indicate or imply that other embodiments or implementations do not fall within the scope of the present invention. It is to be understood that other implementations may be utilized and that structural and method changes may be made without departing from the scope of the present invention.

Overview

A process consistent with the present invention relates to generating a video "effect", supplying the effect's parameters, uploading samples and bitmaps, decoding samples, rendering the effect, outputting the effect, and releasing resources. The process is tuned to utilize the CPU and the GPU in a manner that allows enhanced computing efficiency and allows the introduction and editing of effects in real time.

Enhanced computing efficiency is achieved by avoiding serialization of processing. This may be achieved by utilizing multiple threads to maximize computing efficiency. Each of the processes from uploading, decoding, rendering, and presenting are performed by an independent thread, which allows parallel processing in the effect generation. Further, computing efficiency is increased by avoiding GPU related driver stalls by accessing edited video only when the edited video is completed. This may be achieved by using a query process or a non stalling lock instead of calling the driver blind or delaying commands to avoid conflicts between graphics hardware and the CPU. Additionally, instead of using the CPU to copy the data into the graphics hardware, Bus Mastering may be utilized to avoid direct access delays.

Several terms are utilized throughout the description. The following outline of the terms provides a general overview of the meaning of each term. However, the overview of the terms is not intended to limit the terms to the examples provided, but are intended to cover all equivalents recognized in the art.

3D-Server: An application extension configured to perform 2D/3D related operations & resource management.

Thread: A single process performed by an application, program, or application extension.

Effect: Any kind of 2D/3D effect which could be handled by the "3D-Server." Examples include merging video, such as displaying one video stream within a different video stream (Picture in Picture, "PIP"); adding graphics to video, such as titles; adding still pictures to video; splicing video frames; and adding transition effects between frames.

Timeline: Multiple video or still data which may be combined using effects.

Sample: A portion of the timeline. For example, the sample may be one frame of video data.

Sample Object: A memory construction containing information used in creating the effect. The information may include the sample, reference to the sample, commands issued by different threads (snooping), results of commands issued by different threads, and timing of commands issued by different threads.

Bus Mastering: A process to retrieve data directly from system memory without any interaction with the CPU.

Peripheral Component Interconnect ("PCI"): a high-speed parallel bus originally designed by Intel to connect I/O peripherals to a CPU.

PCI Express: An evolutionary version of PCI that maintains the PCI software usage model and replaces the physical bus with a high-speed (2.5 Gb/s) serial bus serving multiple lanes.

Accelerated Graphics Port ("AGP"): A bus that provides a direct connection from the graphics card to the main memory.

AGP Memory: Memory contained in a system for use by the CPU which can be accessed by the GPU. When AGP or PCI Express is not used, the CPU may need to copy the data which may be slow.

Surface: A memory buffer which is interpreted by a system as a container for image or abstract data. A surface may be contained either in AGP memory or in local video memory.

Free surface list: A list in which all allocated surfaces are placed. There may be different lists for the different type of surfaces. Processes such as threads which find an "empty list" will be initiated as soon as a new sample is available.

Command Packet: A data structure including a command which is passed between threads.

Snooping Command: A dummy command, which is supported by GPU and 3D application program interfaces ("API"), which could be queried to determine if a process has been executed by the GPU. Alternately, a snooping command may be emulated by either using an API's "in use" query or simply waiting some time (e.g., up to 5 ms, depending on when the surface was used).

Figure 3:
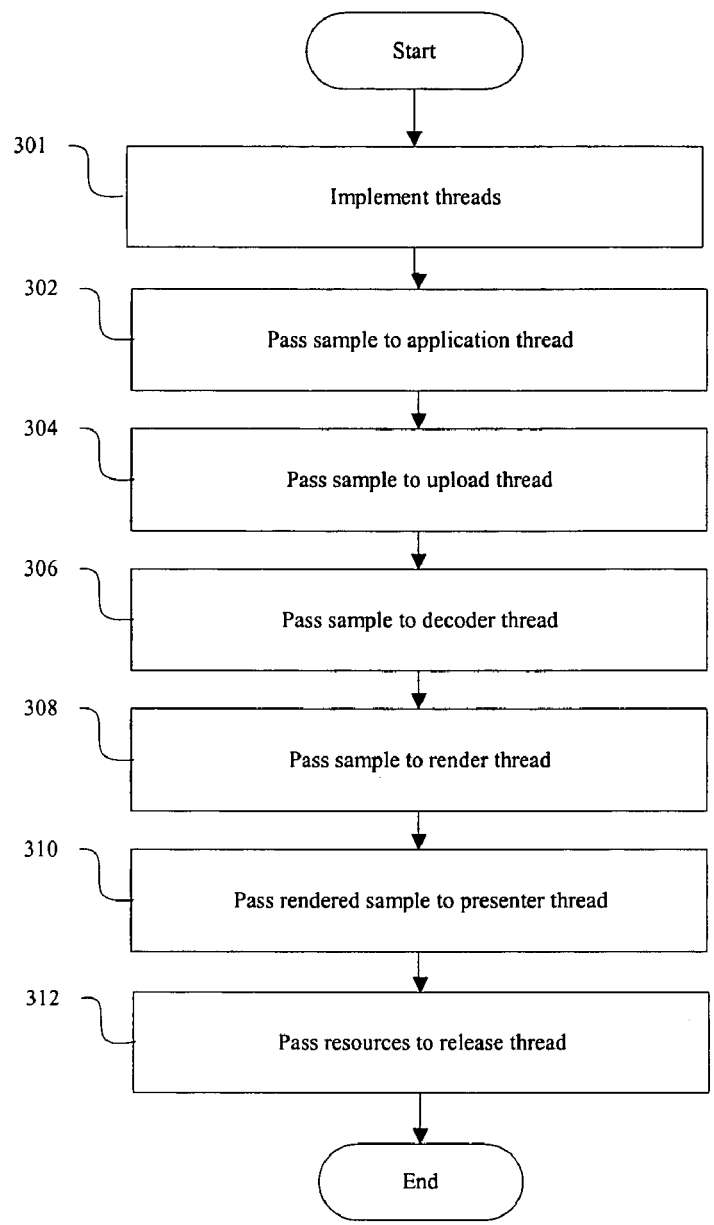
FIG. 3 is a flowchart which illustrates a video effects process consistent with aspects related to the present invention.

FIG. 3 illustrates a general process 300 utilizing multiple threads performed on a processing system for editing video to include effects in real time consistent with aspects related to the present invention. Generally, process 300 takes a sample of a video timeline and passes the sample between the multiple threads for processing.

Process 300 begin by implementing each thread, application, upload, decoder, render, presenter, and release, which will be used by process 300 (stage 301). Then, the processing system passes the sample to the application thread which creates the effects requested for the video (stage 302). Then, the application thread generates "pre-decomposed video." Pre-decomposed video is video data which is compressed by a format such as MPEG and may include video data packets and other static images. Next, the processing system passes the sample to the upload thread which uploads the pre-decomposed video to the graphics card (stage 304). To reduce the work in the processing system, the upload thread may utilize a Bus Mastering processes to upload the video data into the graphics card.

Then, the processing system passes the sample to the decoder thread which performs final decoding of the video data (stage 306). That is, the video data which may be compressed in a format such as MPEG is decoded into raw video data.

Subsequently, the processing system passes the sample to a render thread which generates the effect data and renders the effects (stage 308). Once the effect is rendered, the processing system passes the rendered sample presenter thread which outputs the rendered video sample (stage 310). Then, once the video has been output, the processing system passes any used resources to the release thread which releases the resources used in editing the video (stage 312).

In process 300, in any of the above stages, the threads may be performed in parallel utilizing multiple processing units in the processing system. For example, the decoder thread (stage 306) and render thread (stage 310) may be performed by different processing units on the processing system.

In process 300, since each of the processes from uploading, decoding, rendering, and presenting are performed by an independent thread, the processing system may perform processing in parallel in order to generate the effect. Moreover, after each thread completes its respective processing, the thread may perform a snooping command to indicate that the process is completed. Further, since the completion of each process is noted, computing efficiency may be increased by avoiding GPU related driver stalls by accessing edited video only when the edited video is completed.

Exemplary Environment and Process

Figure 4:
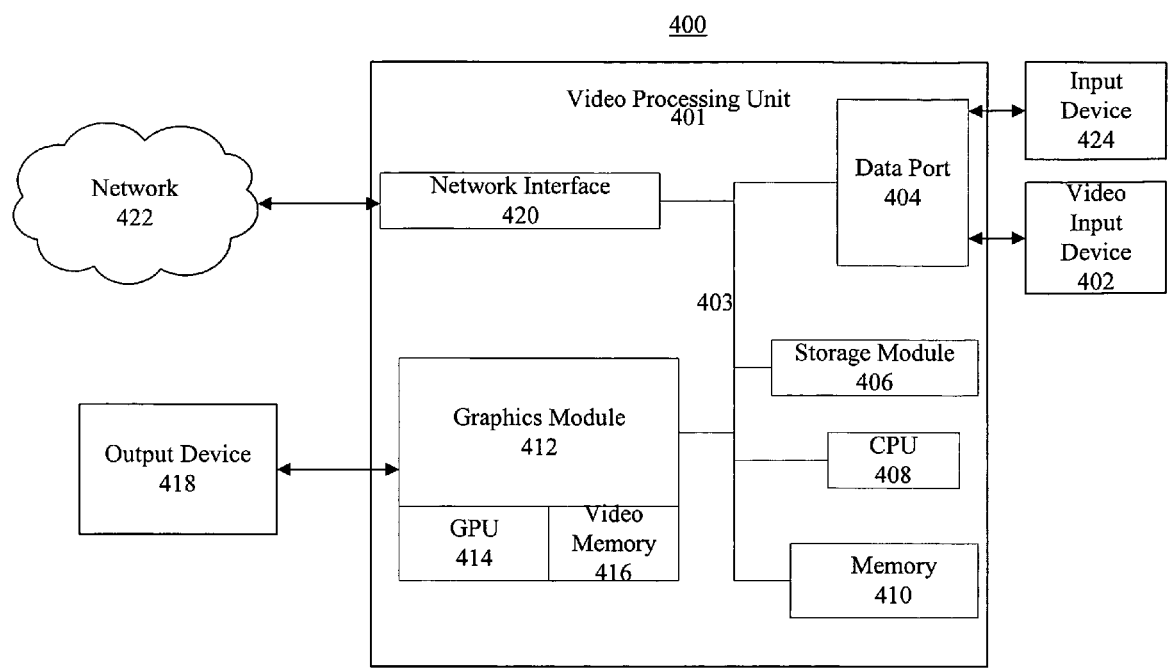
FIG. 4 is a diagram which illustrates a processing environment capable of performing processing consistent with aspects related to the present invention.

FIG. 4 illustrates an exemplary environment 400, in which methods and systems related to the present invention may be implemented consistent with certain embodiments. Environment 400 may include a video processing unit 401, a network 422, an input device 424, a video input device 402, and an output device 418.

Video processing unit 401 may be a personal computer, mobile computing device (e.g., a PDA), mobile communications device (e.g., a cell phone), set top box (e.g., cable or satellite box), video game console, smart appliance, or any other structure that enables a user to receive and process video data. In one exemplary configuration, video processing unit 401 may include data ports 404, a storage module 406, a CPU 408, a memory 410, a graphics module 412, and a network interface 420, interconnected by at least one bus 403.

In environment 400, input device 424 is coupled to data ports 404. Input device 424 may include at least one user-actuated input mode to input commands and thereby select from a plurality of processor operating modes. Input device 424 may include components such as a keyboard, a mouse, and/or a touch screen. Additionally, as mentioned above, input device 424 includes one or more audio capture devices. For example, input device 424 may include a microphone to which a user can input audible utterances. Accordingly, input device 424 may include or be coupled to voice recognition software for recognizing and parsing inputted utterances. The voice recognition software could reside in memory 410. Input device 424 may additionally or alternatively include a data reading device and/or an input port.

Video input device 402 is also coupled to data ports 404. Video input device 402 may include at least a video camera, a still camera, or any other appropriate video production device. Additionally, video input device 402 could include one or more video capture devices (e.g., scanners), video recorders, or any device capable of supplying video data.

Storage module 406 may provide mass storage for video processing unit 401. Storage module 406 may be implemented with a variety of components or subsystems including, for example, a hard drive, an optical drive, CD ROM drive, DVD drive, a general-purpose storage device, a removable storage device, and/or other devices capable of storing information. Further, although storage module 406 is shown within video processing unit 401, storage module 406 may be implemented external to video processing unit 401.

Storage module 406 may include program code and information for video processing unit 401 to communicate with network 422, input device 424, and video input device 402. Storage module 406 may include, for example, program code for various client applications and an Operating System (OS), such as the Windows Operation System provided by Microsoft Corporation. In addition, storage module 406 may include other program network communications, kernel and device drivers, configuration information, video display and editing, and other applications that might be installed on video processing unit 401.

CPU 408 in video processing unit 401 may be operatively configured to execute instructions. CPU 408 may be configured for routing information among components and devices and for executing instructions from memory 410. Although FIG. 4 illustrates a single CPU, video processing unit 401 may include a plurality of general purpose processors and/or special purpose processors (e.g., ASICS). CPU 408 may also include, for example, one or more of the following: a co-processor, memory, registers, and other processing devices and systems as appropriate. CPU 408 may be implemented, for example, using a Pentium™ processor provided from Intel Corporation.

Memory 410 may include any system and/or mechanism capable of storing information. Memory 410 may be embodied with a variety of components and/or subsystems, including a random access memory ("RAM"), a read-only memory ("ROM"), magnetic and optical storage elements, organic storage elements, audio disks, and video disks. Memory 410 may provide a primary memory for CPU 408, such as for program code. Memory 410 may, for example, include program code for an Operating System ("OS"), such as the Windows Operation System provided by Microsoft Corporation, network communications, kernel and device drivers, configuration information, video display and editing, and other applications that might be installed on video processing unit 401.

Although a single memory is shown, any number of memory devices may be included in video processing unit 401, and each may be configured for performing distinct functions. When video processing unit 401 executes an application installed in storage module 406, CPU 408 may download at least a portion of program code from storage module 406 into memory 410. As CPU 408 executes the program code, CPU 408 may also retrieve additional portions of program code from storage module 406.

Graphics module 412 may include any system and/or mechanism capable of processing video and graphics data and outputting video and graphics data. Graphics module 412 may be embodied with a variety of components and/or subsystems, including a GPU 414 and a video memory 416. Graphics module 412 may be implemented, for example, using any appropriate graphics accelerator card compliant with various standards, such as AGP, PCI, or PCI Express.

GPU 414 may be operatively configured to execute instructions related to video and graphics. GPU 414 may be configured for routing information among components and devices and for executing instructions from CPU 408 and memory 410. GPU 414 may include one or a plurality of general purpose processors and/or special purpose processors. GPU 414 may also include, for example, one or more of the following: a co-processor, memory, registers, and other processing devices and systems as appropriate.

Video memory 416 may include any system and/or mechanism capable of storing information. Video memory 416 may be embodied with a variety of components and/or subsystems, including a RAM and/or a read-only memory ROM. Video memory 416 may provide a primary memory for GPU 414. Although a single memory is shown, any number of memory devices may comprise video memory 416, and each may be configured for performing distinct functions.

Video processing unit 401 may be connected to network 422 via network interface 420 which may be operatively connected via a wired and/or wireless communications link. Network interface 420 may be any appropriate mechanism for sending information to and receiving information from network 422, such as a network card and an Ethernet port, or to any other network, such as an attached Ethernet LAN, serial line, etc. In one configuration, network interface 420 may allow video processing unit 401 to interact with processing units as well as the Internet.

Network 422 may be the Internet, a virtual private network, a local area network, a wide area network, a broadband digital network, or any other structure for enabling communication between two or more nodes or locations. Network 422 may include a shared, public, or private data network and encompass a wide area or local area. Network 422 may include one or more wired and/or wireless connections. Network 422 may employ communication protocols, such as Transmission Control and Internet Protocol (TCP/IP), Asynchronous Transfer Mode (ATM), Ethernet, or any other compilation of procedures for controlling communications among network locations. In certain embodiments, network 422 may also include and/or provide telephone services. In such embodiments, network 422 may be included and/or leverage a Public Switched Telephone Network ("PSTN"). Alternatively, network 422 may leverage voice-over Internet Protocol ("VoIP") technology. In certain implementations, network 422 may include and/or leverage PSTN and VoIP technology.

Output device 418 may be configured to visually display text, images, or any other type of information output by graphics module 412 by way of a cathode ray tube, liquid crystal, light-emitting diode, gas plasma, or other type of display mechanism. For example, output device 418 may be a computer monitor. Output device 418 may additionally or alternatively be configured to audibly present information. For example, output device 418 could include an audio output device, such as a speaker, for outputting audible sounds to a user. Accordingly, output device 418 may include or be coupled to audio software configured to generate synthesized or pre-recorded human utterances. Such software could reside in memory 410 and be configured to interact. Output device 418 may be used in conjunction with input device 424 for allowing user interaction.

As mentioned above, video processing unit 401 may comprise additional and/or fewer components than what is shown in FIG. 4, and one or more of the components implanted in video processing unit 401 may be scalable in order to accommodate additional services, data, and/or users.

Although FIG. 4 depicts the various components residing entirely in video processing unit 401, it should be understood that one or more of the components of video processing unit 401 may exist in or be distributed among one or more other processing units (not shown), or other locations, coupled to network 422. For example, applications could reside in other processing units and storage module 406 may reside external to video processing unit 401 and may be coupled to video processing unit 401 via network 422. It should also be understood that, as mentioned above, any number of processing units may be included in environment 400.

In alternative implementations of the instant invention, each of the plurality of other processing units (not shown) may contain a replica or version of all or part of video processing unit 401 respectively. In such implementations, each version may operate exclusively from or collaboratively with each other.

Figure 5A:
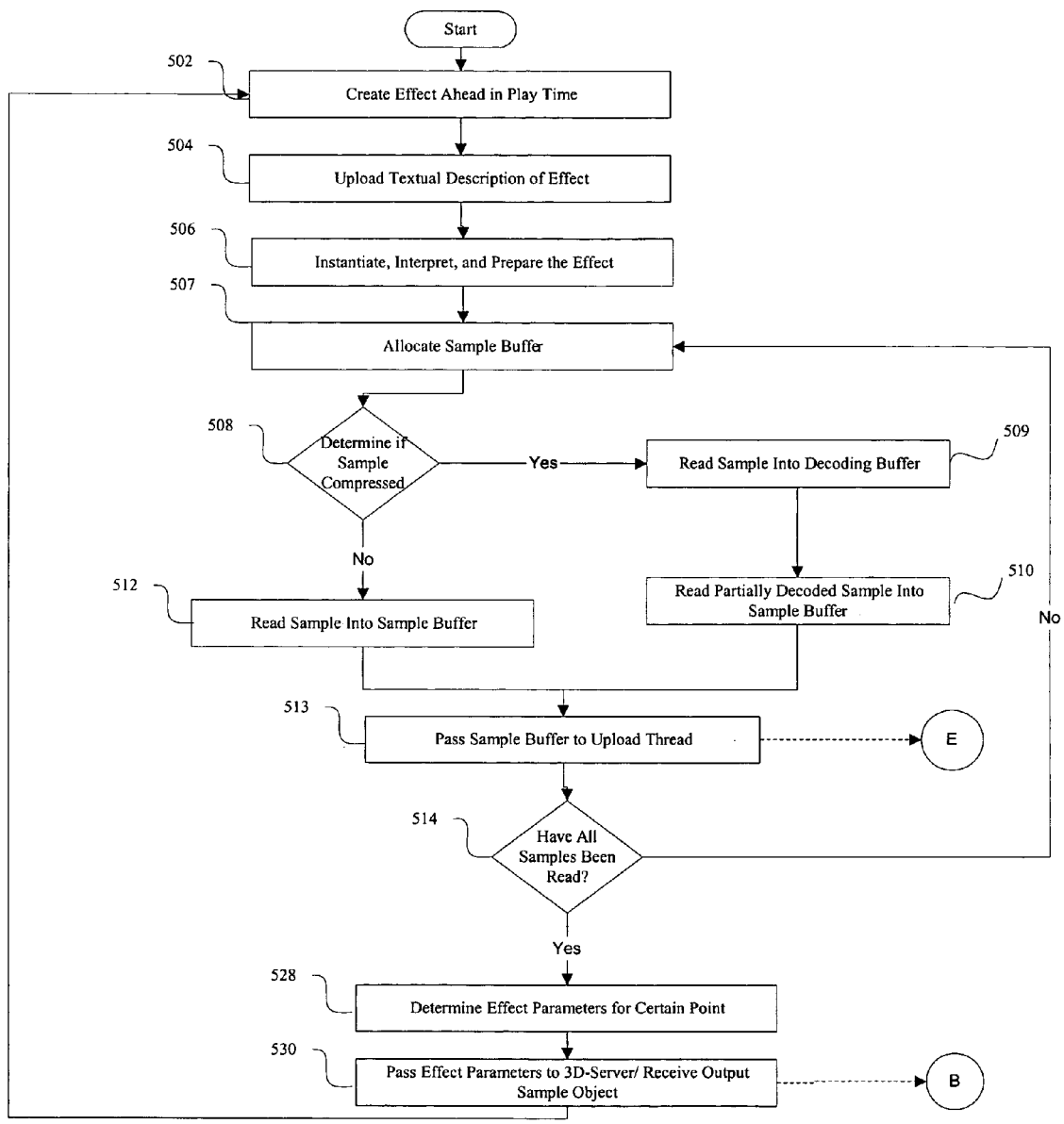
FIGS. 5A and 5B are flowcharts which illustrate a video process consistent with aspects related to the present invention.
Figure 5B:
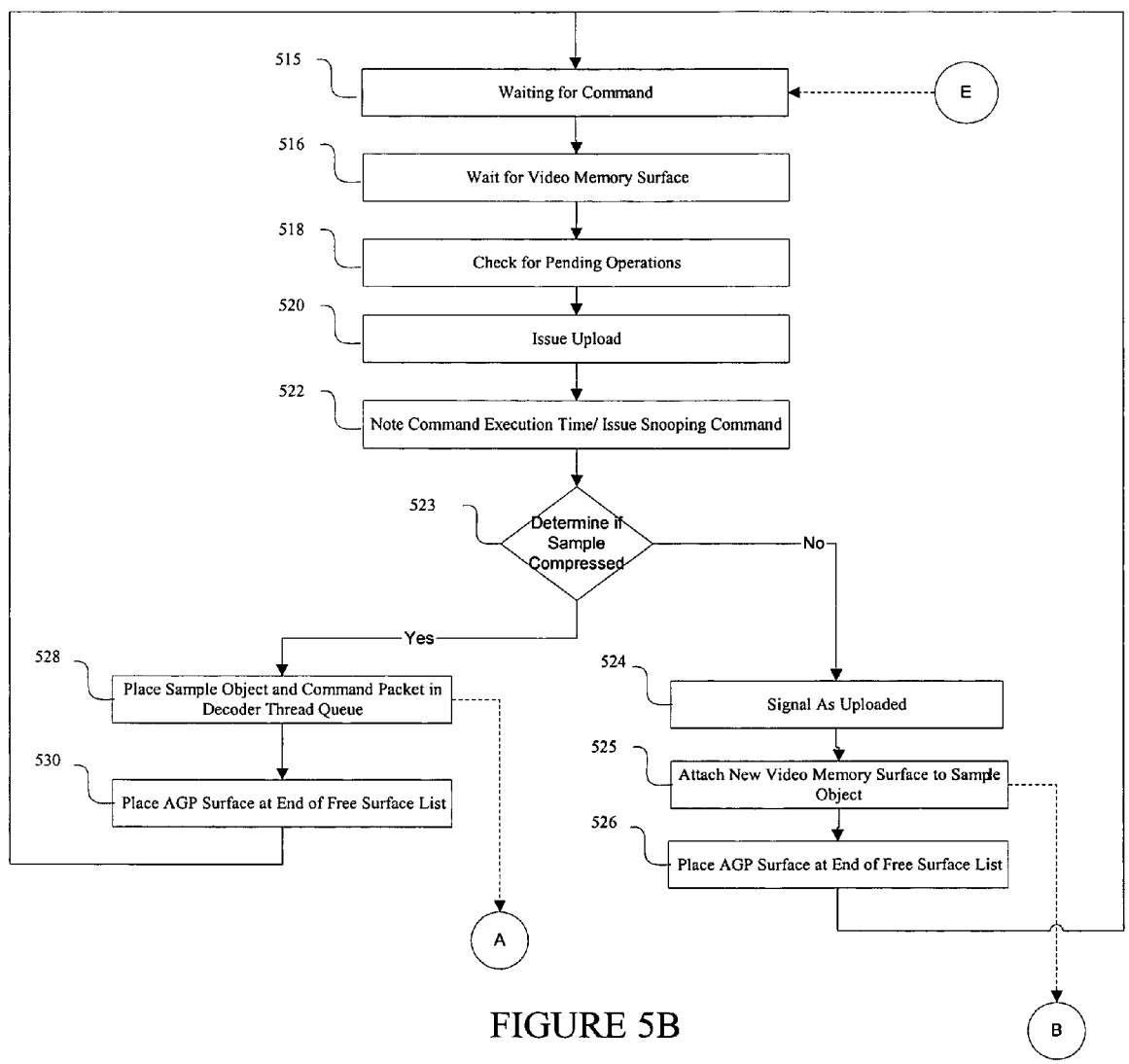

FIGS. 5A and 5B illustrate an exemplary process 500 for creating effects and editing video in real time consistent with aspects related to the present invention. Process 500 may be performed on the environment 400 illustrated in FIG. 4.

The effects and video editing occur in response to an application executing on video processing unit 401. The application may be initiated by the user of video processing unit 401 through input device 424. Additionally, the application may constantly be running on video processing unit 401 and perform video editing for any received video. Also, the application may be initiated by the input or receipt of video data. Exemplary applications may include any appropriate type of program designed to perform a specific function for one or more users or other devices utilizing video or graphics data and a 3D-Server. The application may comprise, but is not limited to, one or more of a word processor; a database program; an internet, extranet, and/or intranet browser or website; a development tool; a scheduling tool; a routing tool; a communication tool; a menu interface; a video display program; a game program including video or 2D/3D effects; a video recording program; and an audio and/or video editing program. The application may be a compilation of instructions for manipulating data written in any structural, procedural, object-oriented, or other type of programming language. As illustrated, the application may comprise a user interface, such as a GUI for facilitating using interaction with the application.

The application may be stored in storage module 406 and/or memory 410. Additionally, the application may be received over network 422 or from input device 424. When an application is installed in storage module 406, CPU 408 may download at least a portion of program code from storage module 406 into memory 410. As CPU 408 executes the program code, CPU 408 may also retrieve additional portions of program code from storage module 406.

Video data to be processed may be obtained or received by various components of environment 400. Video data may be obtained or received from the video input device 402 or network 422. Additionally, video data may be stored in storage module 406 and/or memory 410 and accessed when the application is initiated or created by the application when the application is initiated.

After the application has been initiated, process 500 begins. In process 500, a set of multiple threads are utilized to perform the various editing processing stages. First, the application creates the effect (the effect may be a single effect or multiple effects) ahead in play time (i.e., before the effect is scheduled to be displayed or utilized) in a manner known in the art (stage 502). The application may create the effect using single and/or multiple application threads depending on the complexity or number of the effects. An example of an effect would be PIP to combine separate video data or a menu in a Digital Versatile Disk (DVD). Then, the application uploads a textual description of the effect into the 3D-Server (stage 504). The application instantiates, interprets, and prepares the effect (stage 506). The 3D-Server may be an application extension which is part of a video editing program such as Pinnacle Studio or Liquid.

Next, the application generates or identifies pre-decompressed video data which is part of a timeline. The timeline may be video data of any length such as a full length moving video or a single still picture. The application may generate or identify the video data using a single and/or multiple application threads. The pre-decompressed video data may include video packets and/or other static images, such as titles. The timeline may be divided into different tracks. For example, in a full length moving video, each track may be a single frame of video data. For every track in the timeline, the application will read or generate all samples of video data needed to prepare the effect, determine if the samples are compressed, possibly partially decode the samples, and pass the samples to the 3D Server/upload thread. For example, the application may read the sample of video data from storage module 406 or video input device 402. Additionally, video data, such as textual data, may be generated by the application.

The application allocates a sample buffer for the first sample read or generated (stage 507). The sample buffer may be contained in memory 410 or the memory of storage module 406. Then, the application determines if the sample is compressed (stage 508). If the sample is compressed, the application may partially decode the compressed sample.

If the sample is compressed, the application reads the sample into the decoding buffer (stage 509). The decoding buffer may be contained in memory 410 or the memory of storage module 406. Then, the application reads the partially decoded sample into the sample buffer (stage 510). Next, the application passes the sample buffer to the upload thread (stage 513).

If the sample is not compressed, the application reads the sample into the sample buffer (stage 512). Next, the application passes the sample buffer to the upload thread (stage 513).

The effect created may have more than one sample. The application determines if all the samples have been read (stage 514). If all the samples have not been read, the application repeats allocating the sample buffer and determining whether the sample is compressed (stages 507-513). After all the samples have been read and passed to the upload thread, the upload thread proceeds with upload processing.

Next, the sample object is uploaded into video memory 416 of graphics hardware 412. The sample object initially includes the AGP memory surface. A significant amount of time may be required for allocation of the sample object, depending on the availability and status of the surface. Availability and status of the surface may be checked using the surface's associated snooping command. A snooping command may be a dummy command, which is supported by a GPU and 3D application program interfaces ("API"), which could be inquired to determine if a process has been executed by the GPU. Alternatively, a snooping command may be emulated by either using an API's "in use" inquire or simply waiting some time (e.g., up to 5 ms, depending on when the surface was used).

The upload process may be performed by an upload thread of the 3D-Server. The 3D server/upload thread waits for a command from the application (stage 515). As soon as the upload thread gets the sample object, command packet, and sample buffers, the upload thread will wait until a video memory surface required by the upload thread's specification becomes available (stage 516). For example, the sample object may require a certain amount of memory or a color space type. If the required size or color space type is not available in video memory 416, the upload thread will wait until the memory becomes available. Next, the upload thread will check the video memory surface for pending operations (stage 518). The surface may be checked by using an outstanding snooping command or a 3D API "in use" inquiry. Then, if the surface is ready, the upload thread issues the upload command (stage 520). Since the effect is being prepared ahead in time, graphics module 412 is not awaiting the upload of the sample object. For example, the upload thread may use a Bus Mastering process to copy the data to the video memory surface. Further, the upload thread will note the upload command execution time and a snooping command will be issued and noted on both memory surfaces (stage 522).

Then, the upload thread determines if the sample contained in the sample object is compressed (stage 523). For example, the video data may be compressed using a standard format such as MPEG. If the video data contained in the sample object does not require decompression, the upload will signal the sample object as uploaded (stage 524). Then, a new video memory surface containing the pre-decompressed video data will be attached to the sample object and the sample object and a command packet are passed to a render thread (stage 525). Then, the upload thread places the AGP memory surface, if not used for other purposes, at the end of the free surface list, thereby releasing any waiting process (stage 526).

If the sample requires decoding, the decoder thread is used to decompress the data. The upload thread places the sample object and a command packet in the decoder thread queue (stage 528). Then, the upload thread places the AGP memory surface, if not used for other purposes, at the end of the free surface list, thereby releasing any waiting process (stage 530).

Then, the upload thread will return to stage 516 to begin processing over for the next sample object which requires uploading.

Figure 6:
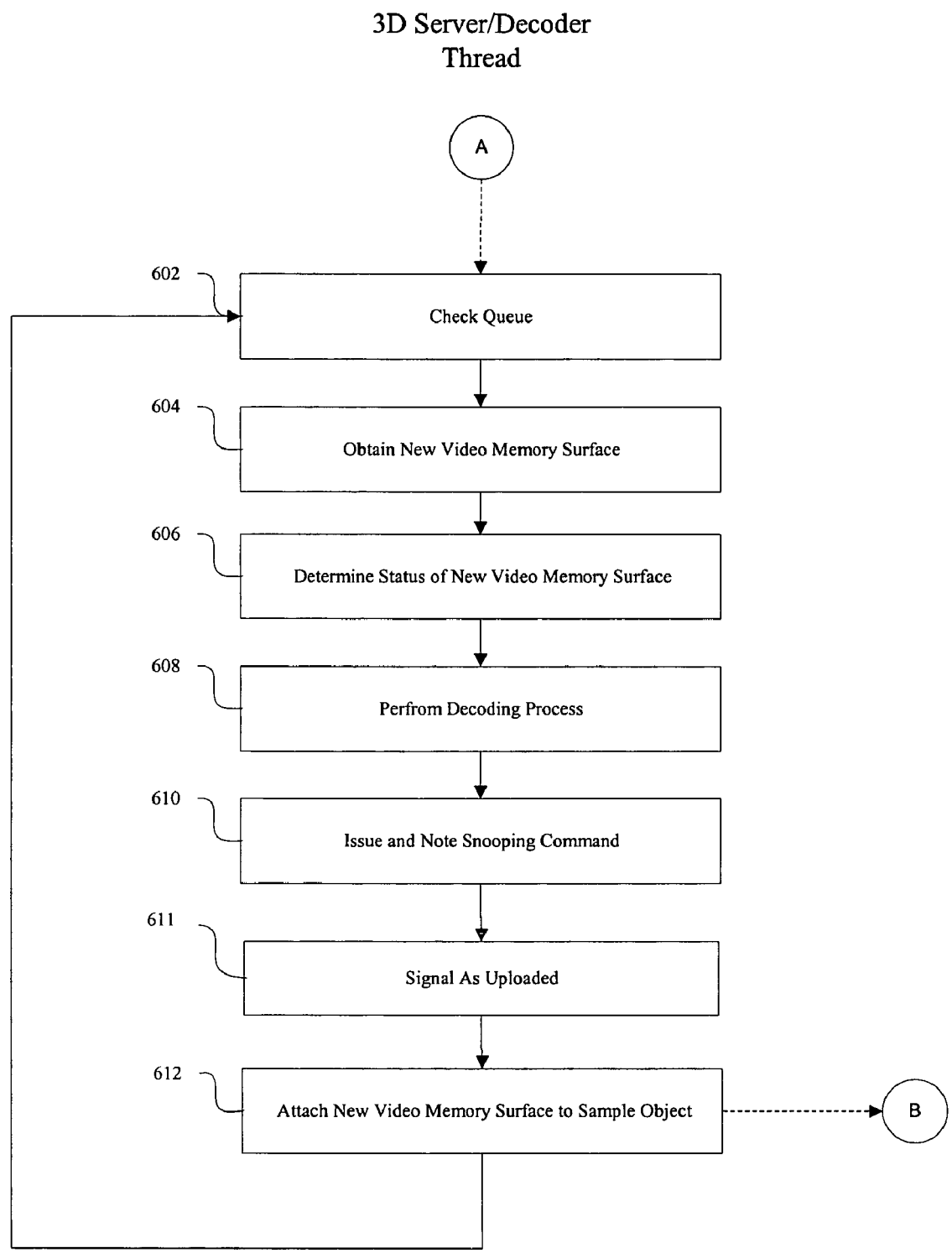
FIG. 6 is a flowchart which illustrates a decoding process performed in conjunction with the video process illustrated in FIG. 5.

FIG. 6 illustrates the process of decoding the sample data by the decoder thread consistent with aspects related to the present invention. The decoding process may be performed by a decoder thread of the 3D-Server. The decoder thread runs continuously and awaits sample objects and command packets to be placed in a queue. First, the decoder thread checks the queue for sample objects and command packets (stage 602). If a sample object and a command packet are in the queue, the decoder thread will proceed with the decoding process. If not, the decoder thread will await a sample object and command packet. The decoder thread may also wait until a snooping command is issued and executed. Alternatively, the decoder thread will wait a certain period of time. For example, the period of time may be some function of the current time and the time when the command was issued (e.g., max(0.5 ms−(<time now>−<time when command was issued>). The decoder thread will then obtain a new video memory surface for the decoded data (stage 604). The new video memory surface may, for example, be included in video memory 416. For example, the surface may match the uncompressed color format.

Then, since the surface must be free of outstanding action, the decoder thread may determine whether the new video memory surface contains any outstanding actions by issuing a snooping command (stage 606). Then, the decoder thread issues a command and performs the decoding process (stage 608). The decoding process may include either "iDCT" (Inverse Discrete Cosine Transform) or "iDCT+Motion Comp." iDCT/Motion Comp is a separate hardware unit on most GPU and may be included in GPU 414, which allows the decode process to be executed in parallel to 3D commands. If necessary, after these commands have been issued, the command time and a snooping command will be issued and noted in both surfaces (stage 610). Then, the decoder thread will signal the sample object as uploaded (stage 611).

Finally, the decoder thread will attach the new video memory surface to the sample object and the decoder thread places the video memory surface containing the pre-decompressed video into the end of the free buffers list (which will release processes waiting for this kind of surface) and the new video memory surface will be attached to the sample object (stage 612). Additionally, the sample object and a command packet are passed to a render thread (stage 612). The decoder thread will then check the queue and begin decoding processing on a new sample object.

While the uploading and decoding are executed, the application thread may continue determining the effect parameters for a certain point in time. The application thread's determination may include collecting all required effects, calculating the time dependent data, and determining the used sample objects for the effects (stage 528, FIG. 5). The application then passes these effect parameters to a render thread, and, in response, the render thread returns an output sample object which can then be used as reference to determine when the sample object with the effect is completed (stage 530). Since the 3D-Server has not defined which physical target surface will be used for the output sample object, the output sample object is only a proxy.

Figure 7:
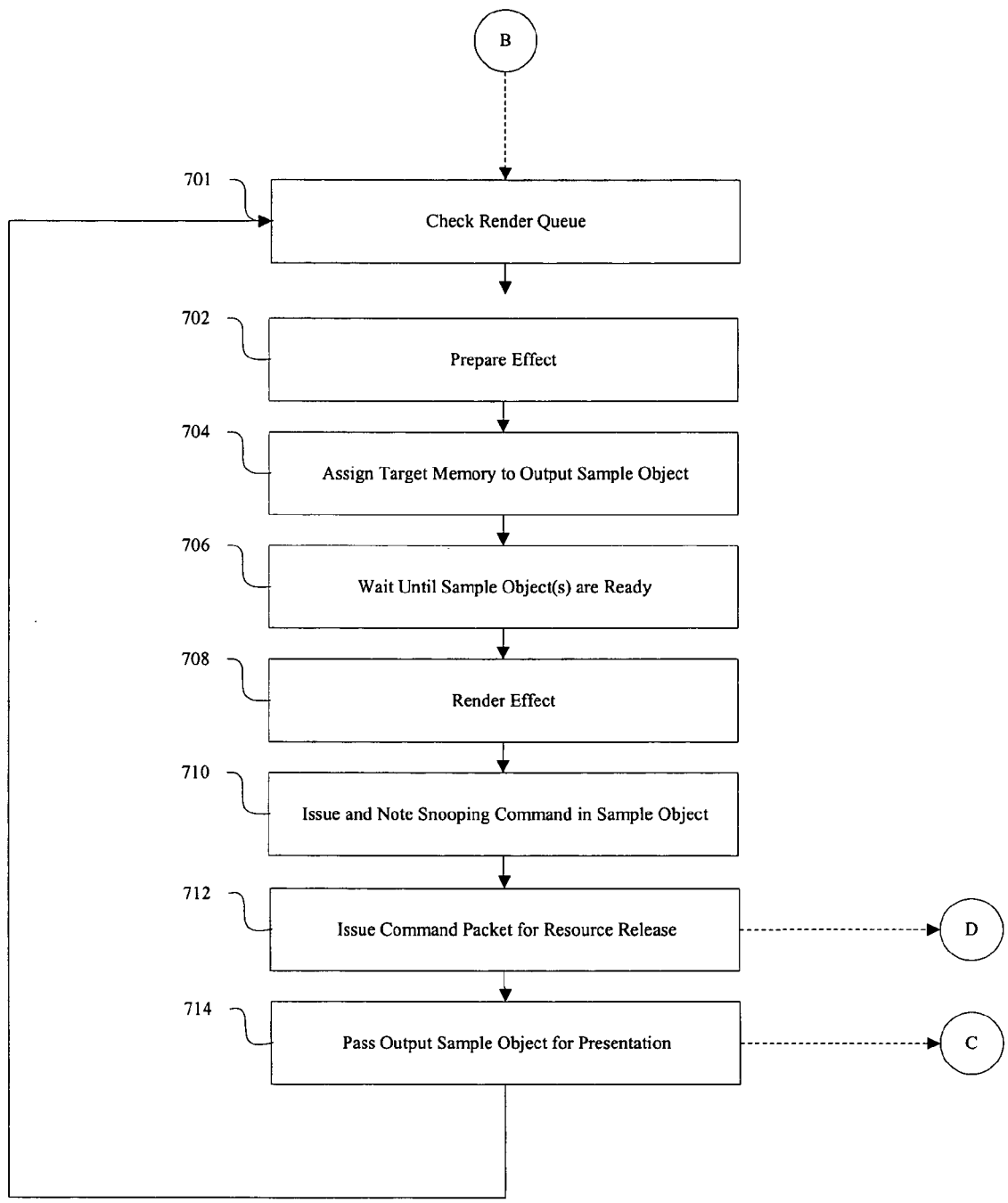
FIG. 7 is a flowchart which illustrates a rendering process performed in conjunction with the video process illustrated in FIG. 5.

Next, the render thread renders the effect. FIG. 7 illustrates a process for rendering the effect consistent with an aspect of the present invention. The rendering process may be performed by a render thread of the 3D-Server. The sample object and the command packet are passed to the render thread and placed in the render queue. The render queue will check the render queue for a sample object and command packet (stage 701). If a sample object and a command packet are in the queue, the render thread will proceed with the rendering process. If not, the render thread will await a sample object and command packet. Additionally, the render thread may await several sample objects and command packets before performing rendering depending on the type of effect being rendered.

The render thread will prepare each used effect according to the effect parameters provided by the application (stage 702). Next, the render thread will then assign a target memory surface to the output sample object (stage 704). The target memory surface may, for example, be included in video memory 416. The target memory surface may also be included in memory 410. Then, the render thread waits until the sample object for the effect is ready for rendering (stage 706). Then, the render thread will render the effect according to the effect parameters (stage 708). The render thread will issue a snooping command and attach it to the sample object (stage 710). Then, the render thread passes a command packet to a release thread in order to allow a process for releasing surfaces and resources (stage 712).

Once the video needs to be displayed, the snooping command is executed and the 3D-Server passes the output sample object and a command to a presenter thread where they are placed in a queue for presentation (stage 714). Since snooping commands have been executed by each thread, video processing unit 401 knows that each process thread has completed its designated task. The render thread will then check the queue and begin render processing on a new sample object.

Figure 8:
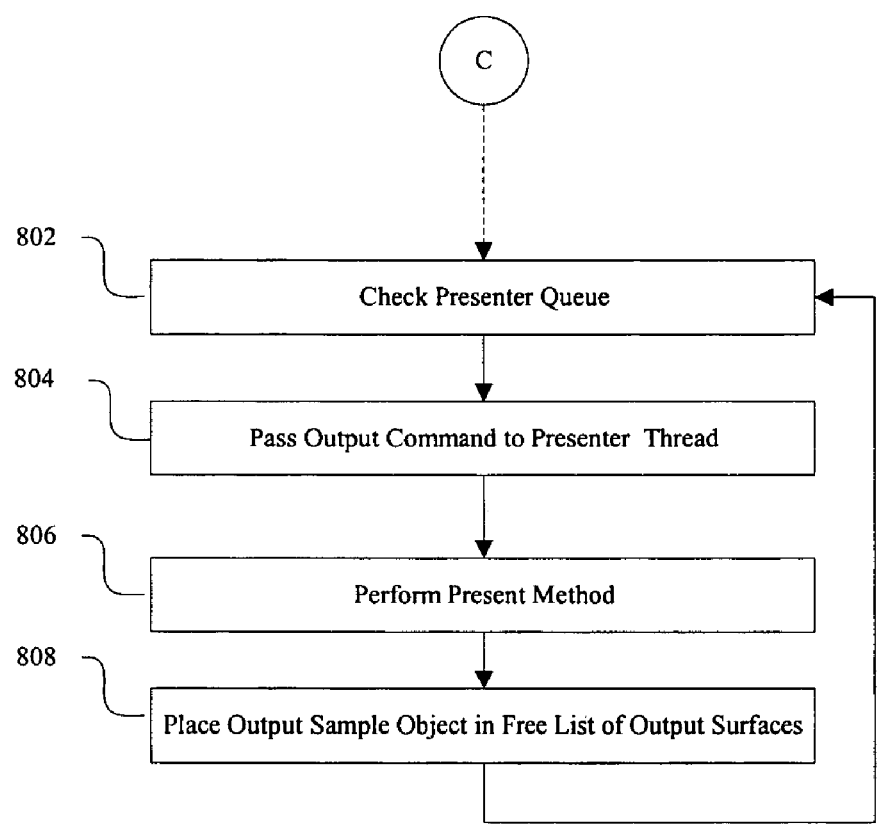
FIG. 8 is a flowchart which illustrates a presenting process performed in conjunction with the video process illustrated in FIG. 5.

FIG. 8 illustrates a process for presenting the video which includes an effect consistent with an aspect of the present invention. The presenting process may be performed by a presenter thread. The presenter thread may be a thread implemented by the 3D server or may be implemented by the application. First, the queue is checked for an output sample object and command packet (stage 802). If the video requires audio data also, the presenter queue may be set for synchronous audio/video presentation. Next, if an output sample and command packet are available, an output command packet is passed to the presenter thread (stage 804). Then, the presenter thread performs a present method that presents the output sample object at the scheduled time (stage 806). For example, the video including the effect may be passed to graphics module 412 and presented on output device 418. Next, the presenter thread places the output sample object back into the free list of output surfaces (stage 808).

Figure 9:
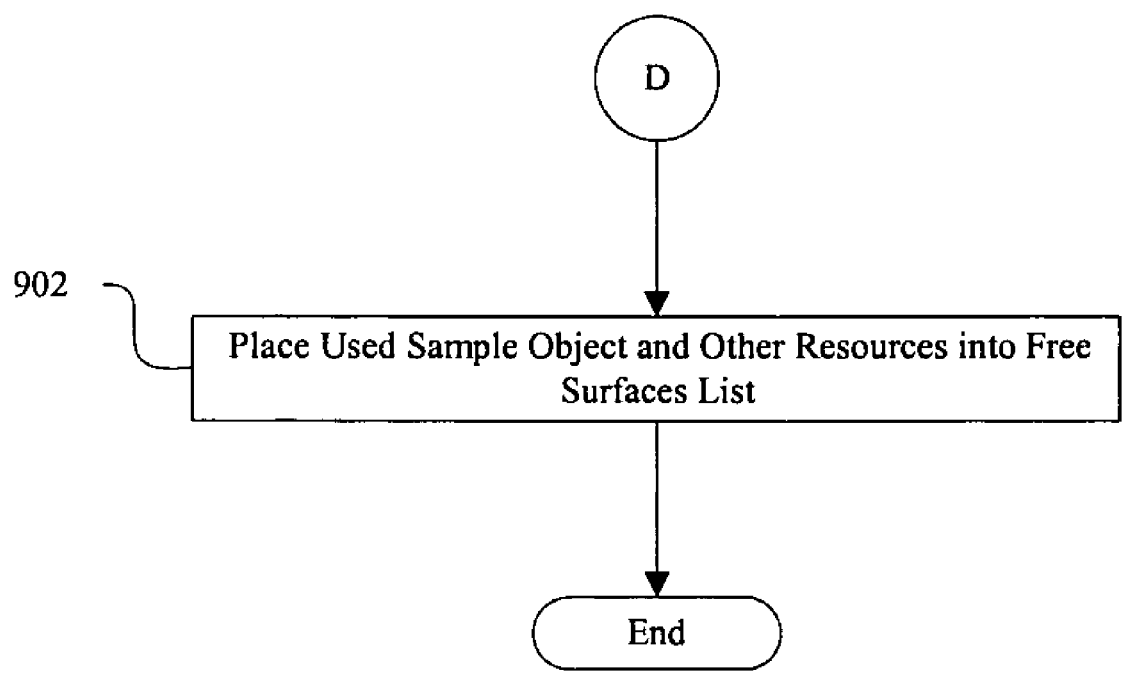
FIG. 9 is a flowchart which illustrates a release process performed in conjunction with the video process illustrated in FIG. 5.

FIG. 9 illustrates a process for releasing resources consistent with an aspect of the present invention. The releasing process may be performed by a releasing thread. The releasing thread may be a thread implemented by the 3D server or may be implemented by the application. Finally, the 3D-server places all used sample objects and other resources into the free surfaces list which releases other waiting processes (stage 902). The releasing process may be performed by a release thread of the 3D server. Process 500 continues until each effect for the timeline has been created and the timeline including the effect has been presented.

Process 500 was described with respect to a video frame with one effect. However, process 500 may be executed for multiple video frames with multiple effects. Furthermore, since the effect is created ahead in play time, the application and 3D-Server simultaneously perform over threads for processing and outputting video data for the current video play time.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing video data to produce an effect to occur at a future time, comprising:

implementing an application thread, an upload thread, a decoding thread, a render thread, and a presenter thread;

passing the video data to the application thread for creating the effect to be added to the video data, generating pre-decompressed video data from the video data, and determining parameters which describe the effect;

passing the pre-decompressed video data to the upload thread for uploading the pre-decompressed video data into video hardware;

passing the pre-decompressed video data to the decoding thread for decoding the pre-decompressed video data to produce decoded video data;

passing the decoded video data to the render thread rendering the effect in the decoded video data to produce output video data;

passing the output video data to the presenter thread to present the output video data;

wherein the application thread performs:
reading a sample of the video data; allocating a sample object for the sample;
partially decoding the sample to produce the pre-decompressed video data; and
transfering the sample object to the upload thread wherein the upload thread performs:
obtaining a video memory surface; issuing a first snooping command; and
uploading the pre-decompressed video data into the video memory surface wherein the decoder thread performs:
issuing a second snooping command; obtaining a new video memory surface;
determining a status of the new video memory surface; performing the decoding to produce the decoded video data in the new video memory surface; and
attaching the new video memory surface to the sample object wherein the application thread further performs:
determining in the application, effect parameters for the effect; and passing the effect parameters from the application to the render thread;

wherein the output sample object is a proxy.

2. A method for processing video data to produce an effect to occur at a future time, comprising the steps of:

receiving the video data;

creating the effect: generating pre-decompressed video data from the video data;

uploading the pre-decompressed video data into video hardware;

decoding the pre-decompressed video data to produce decoded video data;

determining parameters which describe the effect;

rendering the effect in the decoded video data to produce output video data;

presenting the output video data; and releasing resources utilized in decoding and rendering;

wherein the steps of creating the effect, generating pre-decompressed video, and determining parameters are performed by an application;

wherein the steps of uploading the pre-decompressed video, decoding the pre-decompressed video data, rendering the effect, and releasing resources are performed by a 3D-Server; and wherein generating pre-decompressed video data from the video data comprises: reading a sample of the video data; allocating a sample object for the sample; partially decoding the sample to produce the pre-decompressed video data; and transferring the sample object to the 3D-Server.

3. The method according to claim 2, wherein uploading the pre-decompressed video data into video hardware comprises: obtaining a video memory surface; issuing a first snooping command; and uploading the pre-decompressed video data into the video memory surface.

4. The method according to claim 3, wherein the pre-decompressed video data is uploaded into the video memory surface using a Bus Mastering process.

5. The method according to claim 3, wherein decoding the pre-decompressed video data to produce decoded video data comprises:
  issuing a second snooping command; obtaining a new video memory surface;
  determining a status of the new video memory surface;
  performing the decoding to produce the decoded video data in the new video memory surface; and
  attaching the new video memory surface to the sample object.

6. The method according to claim 5, further comprising: determining, in the application, parameters for the effect; passing the effect parameters from the application to the 3D-Server; and receiving, in the application, an output sample object.

7. The method according to claim 6, wherein the output sample object is a proxy.

8. The method according to claim 6, wherein rendering the effect in the decoded video data to produce output video data comprises: assigning a target memory surface to the output sample object; rendering the effect; and storing the rendered effect in the target memory surface.

9. The method according to claim 8, wherein outputting the output video data comprises:
  placing the output sample object in a presenter queue; and
  performing a presenter method to present the output sample object as the output video data.

10. A system for processing video data to produce an effect to occur at a future time, comprising:
  means for implementing an application thread for creating the effect to be added to the video data, generating pre-decompressed video data from the video data, and determining parameters which describe the effect;
  means for implementing an upload thread for uploading the pre-decompressed video data into video hardware;
  means for implementing a decoding thread for decoding the pre-decompressed video data to produce decoded video data;
  means for implementing a render thread rendering the effect in the decoded video data to produce output video data; and
  means for implementing a presenter thread presenting the output video data;
  wherein the means for implementing the application thread comprises: means for reading a sample of the video data; means for allocating a sample object for the sample; means for partially decoding the sample to produce the pre-decompressed video data; and means for transferring the sample object to the upload thread;
  wherein the means for implementing the unload thread comprises: means for obtaining a video memory surface; means for issuing a first snooping command; and means for uploading the pre-decompressed video data into the video memory surface;
  wherein the means for implementing the decoder thread comprises: means for issuing a second snooping command; means for obtaining a new video memory surface; means for determining a status of the new video memory surface; means for performing the decoding to produce the decoded video data in the new video memory surface; and means for attaching the new video memory surface to the sample object;
  wherein the means for implementing the application thread further comprises: means for determining, in the application, effect parameters for the effect; means for passing the effect parameters from the application to the render thread; and
  wherein the output sample object is a proxy.

11. A system for processing video data to produce an effect to occur at a future time, comprising: means for receiving the video data; means for creating the effect; means for generating pre-decompressed video data from the video data; means for uploading the pre-decompressed video data into video hardware; means for decoding the pre-decompressed video data to produce decoded video data; means for determining parameters which describe the effect; means for rendering the effect in the decoded video data to produce output video data; means for presenting the output video data; and means for releasing resources utilized in decoding and rendering;
  wherein the means for creating the effect, means for generating pre-decompressed video, and means for determining parameters are an application;
  wherein the means for uploading the pre-decompressed video, means for decoding the pre-decompressed video data, means for rendering the effect, and means for releasing resources are a 3D-Server; and
  wherein the means for generating pre-decompressed video data from the video data comprises: means for reading a sample of the video data; means for allocating a sample object for the sample; means for partially decoding the sample to produce the pre-decompressed video data; and means for transferring the sample object to the 3D-Server.

12. The system according to claim 11, wherein the means for uploading the pre-decompressed video data into video hardware comprises: means for obtaining a video memory surface; means for issuing a first snooping command; and means for uploading the pre-decompressed video data into the video memory surface.

13. The system according to claim 12, wherein the pre-decompressed video data is uploaded into the video memory surface using a Bus Mastering process.

14. The system according to claim 12, wherein the means for decoding the pre-decompressed video data to produce decoded video data comprises: means for issuing a second snooping command; means for obtaining a new video memory surface; means for determining a status of the new video memory surface; means for performing the decoding to produce the decoded video data in the new video memory surface; and means for attaching the new video memory surface to the sample object.

15. The system according to claim 14, further comprising: means for determining, in the application, parameters for the effect; means for passing the effect parameters from the application to the 3D-Server; and means for receiving, in the application, an output sample object.

16. The system according to claim 15, wherein the output sample object is a proxy.

17. The system according to claim 15, wherein the means for rendering the effect in the decoded video data to produce output video data comprises: means for assigning a target memory surface to the output sample object; means for rendering the effect; and means for storing the rendered effect in the target memory surface.

18. The system according to claim 17, wherein the means for outputting the output video data comprises: means for placing the output sample object in a presenter queue; and means for performing a presenter method to present the output sample object as the output video data.

19. A computer readable medium including instructions for causing a computer system to execute a method for processing video data to produce an effect to occur at a future time, comprising: implementing an application thread for creating the effect to be added to the video data, generating pre-decompressed video data from the video data, and determining parameters which describe the effect; implementing an upload thread for uploading the pre-decompressed video data into video hardware; implementing a decoding thread for decoding the pre-decompressed video data to produce decoded video data; implementing a render thread rendering the effect in the decoded video data to produce output video data; and implementing a presenter thread presenting the output video data;

wherein implementing the application thread comprises: reading a sample of the video data; allocating a sample object for the sample; partially decoding the sample to produce the pre-decompressed video data; and transferring the sample object to the upload thread;

wherein implementing the upload thread comprises: obtaining a video memory surface; issuing a first snooping command; and uploading the pre-decompressed video data into the video memory surface;

wherein implementing the decoder thread comprises: issuing a second snooping command; obtaining a new video memory surface; determining a status of the new video memory surface; performing the decoding to produce the decoded video data in the new video memory surface; and attaching the new video memory surface to the sample object;

wherein implementing the application thread further comprises: determining, in the application, effect parameters for the effect; passing the effect parameters from the application to the render thread; and wherein the output sample object is a proxy.

20. A computer readable medium including instructions for causing a computer system to execute a method for processing video data to produce an effect to occur at a future time, comprising the steps of: receiving the video data; creating the effect; generating pre-decompressed video data from the video data; uploading the pre-decompressed video data into video hardware; decoding the pre-decompressed video data to produce decoded video data; determining parameters which describe the effect; rendering the effect in the decoded video data to produce output video data; presenting the output video data; and releasing resources utilized in decoding and rendering;

wherein the steps of creating the effect, generating pre-decompressed video, and determining parameters are performed by an application;

wherein the steps of uploading the pre-decompressed video, decoding the pre-decompressed video data, rendering the effect, and releasing resources are performed by a 3D-Server; and wherein generating pre-decompressed video data from the video data comprises: reading a sample of the video data; allocating a sample object for the sample; partially decoding the sample to produce the pre-decompressed video data; and transferring the sample object to the 3D-Server.

21. The computer readable medium according to claim 20, wherein uploading the pre-decompressed video data into video hardware comprises: obtaining a video memory surface; issuing a first snooping command; and uploading the pre-decompressed video data into the video memory surface.

22. The computer readable medium according to claim 21, wherein the pre-decompressed video data is uploaded into the video memory surface using a Bus Mastering process.

23. The computer readable medium according to claim 21, wherein decoding the pre-decompressed video data to produce decoded video data comprises: issuing a second snooping command; obtaining a new video memory surface; determining a status of the new video memory surface; performing the decoding to produce the decoded video data in the new video memory surface; and attaching the new video memory surface to the sample object.

24. The computer readable medium according to claim 23, further comprising: determining, in the application, parameters for the effect; passing the effect parameters from the application to the 3D-Server; and receiving, in the application, an output sample object.

25. The computer readable medium according to claim 24, wherein the output sample object is a proxy.

26. The computer readable medium according to claim 24, wherein rendering the effect in the decoded video data to produce output video data comprises: assigning a target memory surface to the output sample object; rendering the effect; and storing the rendered effect in the target memory surface.

27. The computer readable medium according to claim 26, wherein outputting the output video data comprises: placing the output sample object in a presenter queue; and performing a presenter method to present the output sample object as the output video data.

* * * * *